(12) United States Patent
Li et al.

(10) Patent No.: US 11,350,043 B2
(45) Date of Patent: May 31, 2022

(54) IMAGE PROCESSING METHOD AND TERMINAL

(71) Applicant: Huawei Technologies Co., Ltd., Shenzhen (CN)

(72) Inventors: Xiaojuan Li, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 16/631,576

(22) PCT Filed: Sep. 30, 2017

(86) PCT No.: PCT/CN2017/104753
§ 371 (c)(1),
(2) Date: Jan. 16, 2020

(87) PCT Pub. No.: WO2019/015120
PCT Pub. Date: Jan. 24, 2019

(65) Prior Publication Data
US 2020/0169672 A1    May 28, 2020

(30) Foreign Application Priority Data

Jul. 17, 2017  (CN) .......................... 201710582412.4

(51) Int. Cl.
| | |
|---|---|
| *H04N 5/265* | (2006.01) |
| *G06T 7/55* | (2017.01) |
| *H04N 5/232* | (2006.01) |
| *G06T 5/50* | (2006.01) |
| *G06T 7/20* | (2017.01) |

(52) U.S. Cl.
CPC ............... *H04N 5/265* (2013.01); *G06T 5/50* (2013.01); *G06T 7/20* (2013.01); *G06T 7/55* (2017.01); *H04N 5/23229* (2013.01); *H04N 5/232935* (2018.08); *G06T 2207/20221* (2013.01)

(58) Field of Classification Search
None
See application file for complete search history.

(56) References Cited

U.S. PATENT DOCUMENTS

| | | | |
|---|---|---|---|
| 5,999,660 A | 12/1999 | Zorin et al. | |
| 9,641,818 B1 | 5/2017 | Sharma et al. | |
| 10,616,502 B2* | 4/2020 | Ding | H04N 5/23229 |
| 2013/0016878 A1 | 1/2013 | Pan et al. | |

(Continued)

FOREIGN PATENT DOCUMENTS

| | | |
|---|---|---|
| CN | 101938604 A | 1/2011 |
| CN | 102883101 A | 1/2013 |

(Continued)

*Primary Examiner* — James M Hannett
(74) *Attorney, Agent, or Firm* — Conley Rose, P.C.

(57) ABSTRACT

An image processing method includes displaying, by a terminal, a preview image, obtaining, by the terminal, at least one first image in the preview image, receiving, by the terminal, a photographing instruction, obtaining, by the terminal, at least one second image, detecting, by the terminal, a moving target based on the first image and the second image, and splitting, by the terminal, the moving target from the first image and the second image. The method further includes performing fusion processing on the first image and the second image after the splitting.

18 Claims, 13 Drawing Sheets

(56) References Cited

U.S. PATENT DOCUMENTS

| | | | |
|---|---|---|---|
| 2015/0022698 A1* | 1/2015 | Na | H04N 5/23222 |
| | | | 348/241 |
| 2017/0064214 A1 | 3/2017 | Zhang et al. | |
| 2017/0185871 A1* | 6/2017 | Zhang | G06K 9/6271 |

FOREIGN PATENT DOCUMENTS

| | | |
|---|---|---|
| CN | 103079033 A | 5/2013 |
| CN | 103905716 A | 7/2014 |
| CN | 105827952 A | 8/2016 |
| CN | 105931213 A | 9/2016 |
| CN | 106331460 A | 1/2017 |
| EP | 2494498 B1 | 5/2018 |
| JP | H114377 A | 1/1999 |
| WO | 2016107962 A1 | 7/2016 |
| WO | 2016188185 A1 | 12/2016 |
| WO | 2017049430 A1 | 3/2017 |

* cited by examiner

An image is being obtained. Do not shake.

IMAGE PROCESSING METHOD AND TERMINAL

CROSS-REFERENCE TO RELATED APPLICATIONS

This application is a national stage of International Application No. PCT/CN2017/104753, filed Sep. 30, 2017, which claims priority to Chinese Patent Application No. 201710582412.4, filed on Jul. 17, 2017. All of the aforementioned applications are hereby incorporated by reference in their entireties.

TECHNICAL FIELD

This application relates to the field of image processing, and in particular, to an image processing method and a terminal.

BACKGROUND

Currently, in addition to a terminal such as a camera specially used for photographing, many terminals are integrated with a camera function, for example, a smartphone and a tablet. When a user uses a terminal to perform photographing, a photographed image may include an object that is not expected to appear in the image. For example, during photographing of an image of a landscape, a building, or the like, a moving target such as a walking person or a flying object is also included in the image when the image is photographed. In addition, a similar case may also occur during photographing of a portrait of a person, and a moving target such as a walking passer-by, an animal, or an automobile is also included in an image when the image is photographed. These moving targets are objects that are not expected to appear in the image.

In a typical scenario, in a busy season of tourism, a popular tourist attraction is filled with endless streams of tourists, and a user is confronted with a suddenly passing passer-by at any time when using a mobile phone to perform photographing. Consequently, the passer-by is also in a photographed image.

In an existing image processing method, to remove a moving target from an image, a plurality of images need to be obtained during photographing, so that the moving target in the plurality of images has an apparent moving distance. After the user taps a photographing key, the user needs to hold the mobile phone stable and wait for a relatively long time, for example, four seconds, to obtain a plurality of images that satisfy image processing. Consequently, this causes low image photographing efficiency and poor user experience.

SUMMARY

Embodiments of the present invention provide an image processing method and a terminal. After a user taps a photographing key, a waiting time is apparently shortened, photographing efficiency is high, and user experience is good.

According to a first aspect, an image processing method is provided, and includes: displaying, by a terminal, a preview image; obtaining, by the terminal, at least one first image in the preview image; receiving, by the terminal, a photographing instruction; obtaining, by the terminal, at least one second image; detecting, by the terminal, a moving target based on the first image and the second image; and splitting, by the terminal, the moving target from the first image and the second image, and performing fusion processing on the first image and the second image after the splitting.

In this embodiment of the present invention, to remove a moving target from an image, a plurality of images need to be obtained. It is not that the terminal obtains the plurality of images only after receiving the photographing instruction, but the terminal starts to obtain the images in an image preview phase before receiving the photographing instruction. Therefore, a quantity of images that need to be obtained after the photographing instruction is received is reduced, so that a required photographing time is apparently shortened, photographing efficiency is high, and user experience is good.

In a possible implementation, the displaying, by the terminal, a preview image includes: displaying, by the terminal, the preview image when a camera function of the terminal is enabled; or displaying, by the terminal, the preview image when a camera function of the terminal enters a first photo mode; or displaying, by the terminal, the preview image when the terminal receives the photographing instruction and a first time interval elapses. According to the implementation, the image processing method may be applied to any photo mode after the camera function is enabled, or applied only to a preset photo mode after the camera function is enabled. The preset photo mode may be an existing portrait photo mode, or a newly added passer-by removal mode. The image processing method not only may be applied to first-time photographing after the camera function is enabled, but also may be applied to subsequent photographing after the first-time photographing is completed.

In a possible implementation, the obtaining, by the terminal, at least one first image in the preview image includes: obtaining, by the terminal, a preset quantity of first images in the preview image. According to the implementation, the terminal may obtain the preset quantity of images from the preview image, to reduce a quantity of images obtained in a photographing phase, and correspondingly reduce a required photographing time.

In a possible implementation, the obtaining, by the terminal, a preset quantity of first images in the preview image includes: obtaining, by the terminal, one of the first images in the preview image each time a second time interval elapses, until the preset quantity of first images in the preview image are obtained. According to the implementation, the terminal no longer obtains an image after obtaining the preset quantity of images in a preview phase, so that a processing resource and a storage resource of the terminal can be saved.

In a possible implementation, the obtaining, by the terminal, a preset quantity of first images in the preview image includes: obtaining, by the terminal, one of the first images in the preview image each time a second time interval elapses, and when a quantity of obtained first images in the preview image exceeds the preset quantity, retaining the preset quantity of recently obtained first images in the preview image. According to the implementation, after obtaining the preset quantity of images in the preview phase, the terminal continues to obtain an image, and retains the preset quantity of recently obtained first images in the preview image, so that not only a storage resource of the terminal can be saved, but also a relatively good image processing effect can be ensured.

In a possible implementation, the obtaining, by the terminal, at least one first image in the preview image includes:

obtaining, by the terminal, at least two first images in the preview image within a third time interval. According to the implementation, the terminal determines, based on a time span of the plurality of images obtained in the preview phase, whether to continue to obtain an image, so that not only a storage resource of the terminal can be saved, but also a relatively good image processing effect can be ensured.

In a possible implementation, before the obtaining, by the terminal, at least one first image in the preview image, the method further includes: obtaining, by the terminal, motion data of the terminal; and determining, by the terminal based on the motion data, that the terminal is in a stable state. According to the implementation, the terminal first determines that the terminal is in the stable state, and then obtains the at least one first image in the preview image, to ensure that quality of the obtained images meets a requirement.

In a possible implementation, the detecting, by the terminal, a moving target based on the first image and the second image includes: determining, by the terminal, depth of field information of the first image and depth of field information of the second image based on the first image and the second image; and detecting, by the terminal, the moving target based on the depth of field information. According to the implementation, the moving target is detected by using the depth of field information, so that accuracy of detecting the moving target can be effectively improved.

In a possible implementation, the terminal has dual camera lenses. According to the implementation, the depth of field information can be relatively accurately determined by using the dual camera lenses, so that the moving target can be accurately detected based on the depth of field information.

According to a second aspect, an embodiment of the present invention provides a terminal. The terminal may implement functions performed in the method design in the foregoing first aspect, and the functions may be implemented by hardware or may be implemented by hardware executing corresponding software. The hardware or the software includes one or more modules corresponding to the foregoing functions.

According to a third aspect, an embodiment of the present invention provides a terminal. A structure of the terminal includes a processor, and the processor is configured to support the terminal in performing a corresponding function in the foregoing method in the first aspect. The terminal may further include a camera lens, and the camera lens is configured to obtain an image. The terminal may further include a display screen, and the display screen is configured to display an image. The terminal may further include a memory. The memory is configured to couple to the processor, and stores a program instruction and data that are necessary for the terminal.

According to a fourth aspect, an embodiment of the present invention provides a chip. The chip may be disposed in a terminal, and the chip includes a processor and an interface. The processor is configured to support the chip in performing a corresponding function in the method according to the first aspect. The interface is configured to support the chip in communicating with another chip or another network element. The chip may further include a memory. The memory is configured to couple to the processor, and stores a program instruction and data that are necessary for the chip.

According to a fifth aspect, an embodiment of the present invention provides a computer storage medium, configured to store a computer software instruction used by the foregoing terminal. The computer software instruction includes a program designed for executing the first aspect.

According to a sixth aspect, an embodiment of the present invention provides a computer program product, including an instruction. When the program is executed by a computer, the instruction enables the computer to perform a function performed by the terminal in the method design according to the first aspect.

DESCRIPTION OF EMBODIMENTS

Figure 1:
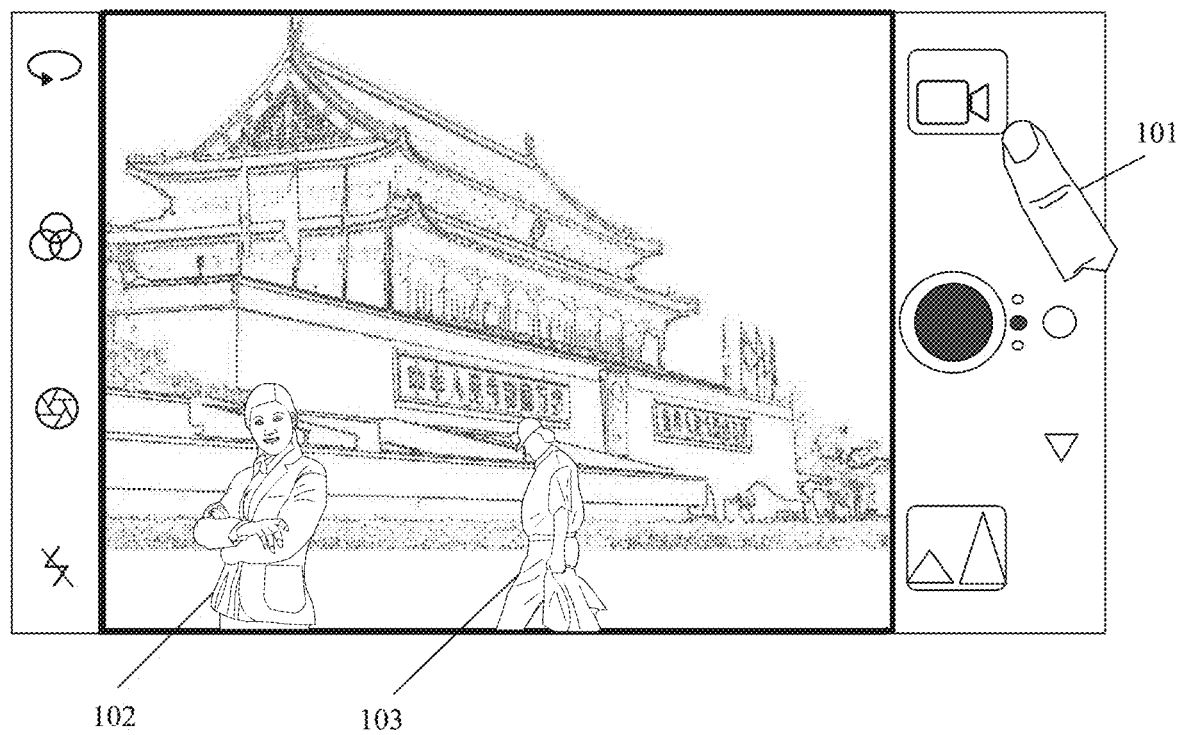
FIG. 1 is a schematic diagram of an application scenario of an image processing method according to an embodiment of the present invention.

FIG. 1 is a schematic diagram of an application scenario of an image processing method according to an embodiment of the present invention. As shown in FIG. 1, when a user 101 uses a terminal to photograph a photographed person 102, a moving target 103 walks behind the photographed person 102. After the photographing is completed and an image is obtained, the image that is not processed includes not only the photographed person 102 but also the moving target 103. After the moving target 103 is removed from the image by using the image processing method provided in the embodiments of the present invention, an obtained image includes only the photographed person 102 and does not include the moving target 103.

It should be noted that, FIG. 1 is only an example of the application scenario in this embodiment of the present invention, and is not used as a limitation to the application scenario in this embodiment of the present invention. The application scenario in this embodiment of the present invention may alternatively be that the moving target 103 passes by before the photographed person 102 or the moving target 103 passes by beside the photographed person 102. The moving target 103 may be a pedestrian shown in FIG. 1, or may be a moving animal or another object. For example, a possible scenario is that a vehicle passes by behind the photographed person, or a possible scenario is that the moving target passes by behind the user when the user uses the terminal to take a self-portrait. In other words, this embodiment of the present invention may be applied to a scenario in which the moving target passes by in each direction of the photographed person when the user photographs the photographed person or the user takes a self-portrait.

According to the image processing method provided in the embodiments of the present invention, image processing is performed on an image obtained by the terminal in a preview phase and an image obtained by the terminal in a photographing phase, to detect a moving target, and remove the moving target from the image. In this embodiment of the present invention, a first image is used to represent the image that is obtained by the terminal in the preview phase, and a second image is used to represent the image that is obtained by the terminal in the photographing phase. Usually, the terminal enters the preview phase after a camera function is enabled. In this case, the terminal may continuously acquire images by using a camera lens. For example, the terminal acquires 24 frames of images (also referred to as 24 images) per second, and displays the acquired images by using a display screen. In this case, the user may view a plurality of dynamic images by using the display screen. It may be understood that, because first images obtained by the terminal in the preview phase are used to adjust a camera lens parameter, assist in framing, and the like, the terminal usually does not store these first images. Usually, the terminal enters the photographing phase when receiving a photographing instruction. In this case, the terminal may obtain one or more images by using the camera lens, and store these second images. A manner in which the terminal receives the photographing instruction may include: The user taps a photographing function icon displayed on the screen, the user presses a function key of a mobile phone, the user sends a voice for photographing, or the user makes a preset gesture. It may be understood that when the terminal completes the photographing, the terminal may enter the preview phase again.

The image processing method provided in the embodiments of the present invention may be applied to any terminal that has a camera function. The terminal may acquire an image by using the camera lens, to have the camera function. The terminal may be a mobile phone, a cellular telephone, a tablet (tablet personal computer, TPC), a laptop computer (laptop computer), a digital camera, a digital camcorder, a projection device, a wearable device (wearable device), a personal digital assistant (personal digital assistant, PDA), an e-book reader (e-book reader), a virtual reality intelligent device, a digital broadcasting terminal, a message transceiver device, a game console, a medical device, a fitness device, a scanner, or the like. The terminal may establish communication with a network by using a wireless wide area network (wireless wide area network, WWAN) or a wireless local access network (wireless local access network, WLAN).

Figure 2:
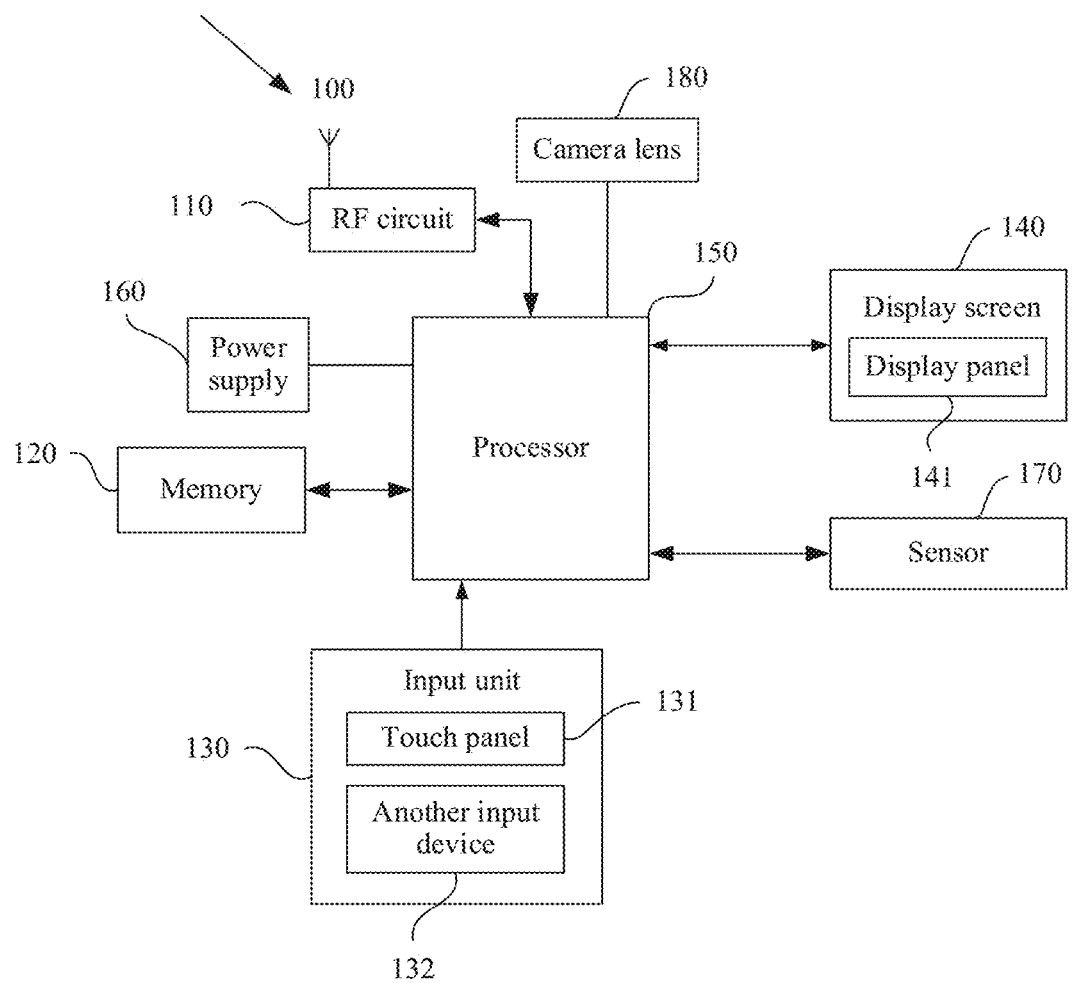
FIG. 2 is a schematic structural diagram of a terminal according to an embodiment of the present invention.

In the embodiments of the present invention, descriptions are provided by using an example in which the terminal is a mobile phone. FIG. 2 is a structural block diagram of a mobile phone 100 related to the embodiments of the present invention. Referring to FIG. 2, the mobile phone 100 includes components such as a radio frequency (radio frequency, RF) circuit 110, a memory 120, an input unit 130, a display unit 140, a processor 150, a power supply 160, a sensor 170, and a camera lens 180. A person skilled in the art may understand that a structure of the terminal shown in FIG. 2 does not constitute a limitation to the terminal, and the terminal may include more components or fewer components than those shown in the figure, or some components may be combined, or a different component deployment may be used.

The RF circuit 110 may be configured to: receive and send information, or receive and send a signal during a call, for example, exchange information with a device such as a server, and send the received information to the processor 150 for processing. The RF circuit 110 usually includes but is not limited to an antenna, at least one amplifier, a transceiver, a coupler, a low noise amplifier (low noise amplifier, LNA), a duplexer, and the like. In addition, the RF circuit 110 may alternatively communicate with a network and another device through wireless communication. Any communications standard or protocol may be used for the wireless communication, and includes but is not limited to global system for mobile communications (Global System for Mobile communications, GSM), general packet radio service (General Packet Radio Service, GPRS), a code division multiple access (Code Division Multiple Access, CDMA) system, a wideband code division multiple access (Wideband Code Division Multiple Access, WCDMA) system, a long term evolution (Long Term Evolution, LTE) system, email, short messaging service (Short Messaging Service, SMS), and the like.

The memory 120 may be configured to store a software program and a module. The processor 150 runs the software program and the module that are stored in the memory 120, so that the mobile phone performs the foregoing image processing method. The memory 120 may mainly include a program storage area and a data storage area. The program storage area may store an operating system, an application program (such as a sound playing function or an image playing function) required for implementing the foregoing image processing method, and the like. The data storage area may store data (such as audio data and an address book) created based on usage of the mobile phone 100, and the like. In addition, the memory 120 may include a volatile memory (volatile memory), for example, a nonvolatile dynamic random access memory (Nonvolatile Random Access Memory, NVRAM), a phase-change random access memory (Phase Change RAM, PRAM), a magnetoresistive random access memory (Magnetoresistive RAM, MRAM), and the like. The memory 120 may further include a nonvolatile memory, for example, at least one magnetic disk storage device, an electrically erasable programmable read-only memory (Electrically Erasable Programmable Read-Only Memory, EEPROM), a flash memory device such as a NOR flash memory (NOR flash memory) or a NAND flash memory (NAND flash memory), or a semiconductor device such as a solid-state drive (Solid State Disk, SSD). The memory 120 may further include a combination of the foregoing types of memories.

The input unit 130 may be configured to receive an instruction entered by a user. Specifically, the input unit 130 may include a touch panel 131 and another input device 132. The touch panel 131, also referred to as a touchscreen, may collect a touch operation (for example, an operation performed by a user on the touch panel 131 or near the touch panel 131 by using any proper object or accessory such as a finger or a stylus) of the user on or near the touch panel 131, and drive a corresponding connection apparatus based on a preset program. Optionally, the touch panel 131 may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into coordinates of a touch point, and then sends the coordinates of the touch point to the processor 150. In addition, the touch controller can receive and execute a command sent by the processor 150. In addition, the input unit 130 may implement the touch panel 131 in a plurality of types, such as a resistive type, a capacitive type, an infrared type, and a surface acoustic wave type. In addition to the touch panel 131, the input unit 130 may include the another input device 132. Specifically, the another input device 132 may include but is not limited to one or more of a physical keyboard, a function key (such as a volume control key or a power on/off key), a trackball, a mouse, a joystick, and the like.

The display screen 140 may be configured to display information entered by the user, information provided for the user, or the like, for example, display an image. The display screen 140 may include a display panel 141. Optionally, the display panel 141 may be configured in a form of a liquid crystal display (liquid crystal display, LCD), an organic light-emitting diode (organic light-emitting diode, OLED), or the like. Further, the touch panel 131 may cover the display panel 141. After detecting a touch operation on or near the touch panel 131, the touch panel 131 transmits the touch operation to the processor 150 to determine a type of a touch event, and then the processor 150 provides a corresponding visual output on the display panel 141 based on the type of the touch event. For example, after detecting an instruction for enabling a camera function, the touch panel 131 transmits the instruction to the processor 150 to determine to enable the camera function, and then the processor 150 provides a corresponding preview image on the display panel 141 based on an image obtained by the camera lens 180. In FIG. 2, the touch panel 131 and the display panel 141 are used as two independent components to implement input and output functions of the terminal. However, in some embodiments, the touch panel 131 may be integrated with the display panel 141 to implement the input and output functions of the terminal.

The processor 150 is a control center of the terminal, and is connected to various parts of the entire terminal by using various interfaces and lines. By running or executing the software program and/or module stored in the memory 120, and invoking the data stored in the memory 120, the processor 150 performs various functions of the mobile phone 100 and processes data, for example, performs the image processing method. The processor 150 may be a central processing unit (central processing unit, CPU), a general-purpose processor, a digital signal processor (digital signal processor, DSP), an application-specific integrated circuit (application specific integrated circuit, ASIC), a field programmable gate array (field programmable gate array, FPGA) or another programmable logical device, a transistor logical device, a hardware component, or any combination thereof. The processor 150 may implement or execute various examples of logical blocks, modules, and circuits that are described with reference to content disclosed in this application. Alternatively, the processor 150 may be a combination for implementing a computing function, for example, a combination of one or more microprocessors or a combination of a DSP and a microprocessor. Optionally, the processor 150 may include one or more processing units. Optionally, an application processor and a modem processor may be integrated in the processor 150. The application processor mainly processes an operating system, a user interface, an application program, and the like. The modem processor mainly processes wireless communication. It may be understood that the foregoing modem processor may alternatively not be integrated into the processor 150.

The terminal further includes the power supply 160 (for example, a battery) for supplying power to the components. Preferably, the power supply may be logically connected to the processor 150 by using a power supply management system, thereby implementing functions such as charging, discharging, and power consumption management by using the power supply management system.

The terminal further includes the sensor 170. The terminal may include one or more sensors. Only one sensor is shown in the figure as an example, and the terminal may include a plurality of types of sensors that may be but are not limited to a motion sensor, a pressure sensor, a distance sensor, an acceleration sensor, a gyro sensor, a GPS sensor, a direction sensor, a temperature sensor, and the like. In running processes, different types of applications may use different sensors. In the embodiments of the present invention, whether the terminal is held stable may be determined based on information about a sensor.

The terminal further includes the camera lens 180. The camera lens 180 may be configured to obtain an image. The photographed object image is a bitmap including a pixel dot-matrix. The camera lens 180 may include one or more camera lenses, for example, a camera lens array including two or more camera lenses. The camera lens 180 may include one or more parameters. These parameters include a lens focal length, a shutter speed, an ISO sensitivity, a resolution, and the like. When there are at least two camera lenses, parameters of these camera lenses may be the same or may be different. The foregoing parameters are manually set by the user or automatically set by the mobile phone 100, to obtain an image.

Although not shown, a Bluetooth module, an audio circuit, a USB module, and the like may be further included in the terminal. Details are not described herein.

Figure 3:
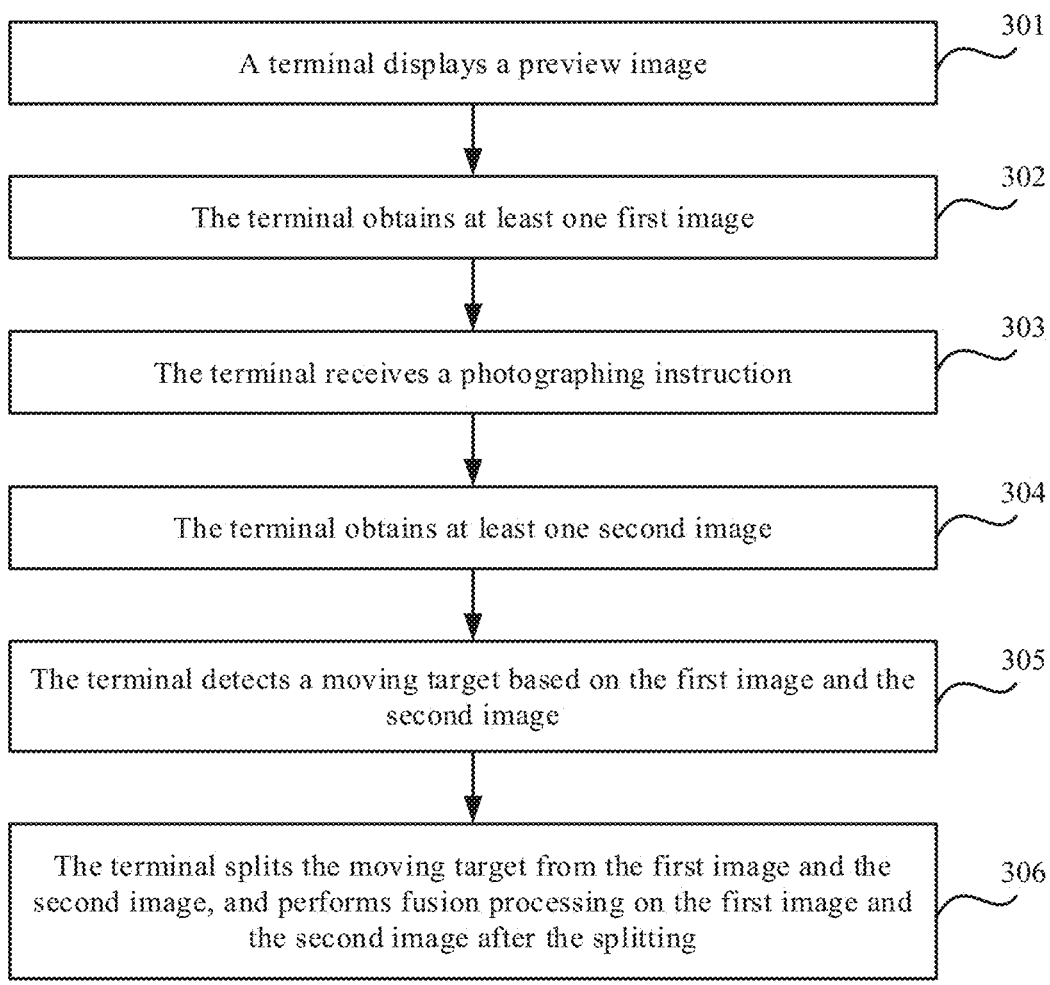
FIG. 3 is a flowchart of an image processing method according to an embodiment of the present invention.

FIG. 3 is a flowchart of an image processing method according to an embodiment of the present invention. The method may be based on the application scenario shown in FIG. 1, and may be performed by the terminal shown in FIG. 2.

The method includes the following steps.

Step 301: The terminal displays a preview image.

The terminal may display the preview image in an entire area referred to as a "full screen") of a display screen, or may display the preview image in a partial area of a display screen. For example, the terminal displays the preview image in a window. The window may be located at any location on the display screen, including a location such as an upper part, a lower part, a left part, or a right part. This is not limited in this application.

In an example, when a camera function of the terminal is enabled, the terminal displays a preview image.

The terminal may enable the camera function when receiving an instruction sent by a user for enabling the camera function. The user may send, in a plurality of manners, the instruction for enabling the camera function to the terminal. These manners include: The user may enable the terminal to enable the camera function, by using a gesture, for example, controlling the terminal to be horizontally placed for two seconds, or drawing a shape (for example, "C") on a touchscreen. Alternatively, the user taps an icon displayed on a screen, to enable the terminal to enable the camera function. The icon may be an application icon, and an application corresponding to the application icon may be a camera application pre-installed in the terminal, or may be a third-party application. Alternatively, the user may press a function key of the mobile phone to enable the terminal to enable the camera function. The function key may be a volume key (for example, a volume up "+" key or a volume down "−" key) or a home (home) key. Alternatively, the user may use a voice to enable the terminal to enable the camera function. For example, the user sends a voice indication of "enabling the camera function".

In another example, when the camera function of the terminal enters a first photo mode, the terminal displays a preview image. In the photo mode, parameters (for example, a focal length, an aperture value, a shutter value, and a light sensitivity) of the camera lens may be set, and a parameter (for example, a parameter about whether to perform moving target detection) for performing image processing on an image obtained by the camera lens.

The camera function of the terminal may include a plurality of types of photo modes, for example, a landscape mode, a portrait mode, a night shot mode, a sports mode, a macro mode, a panorama mode, and a passer-by removal mode. The first photo mode may be any one of the foregoing photo modes, to be specific, the image processing method provided in this embodiment of the present invention may be used when the camera function of the terminal enters the first photo mode.

Figure 4:
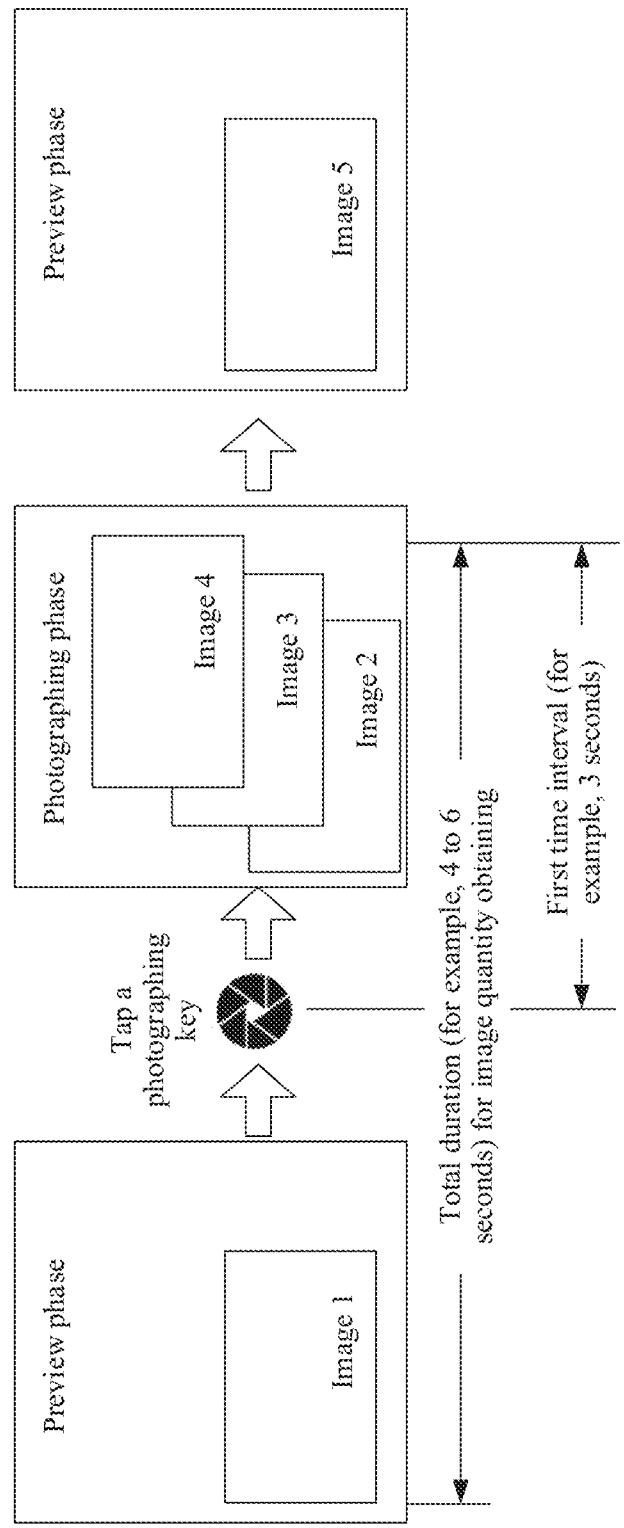
FIG. 4 is a schematic diagram of an occasion for displaying a preview image according to an embodiment of the present invention.

In another example, when the terminal receives a photographing instruction and a first time interval elapses, the terminal displays a preview image. FIG. 4 is a schematic diagram of an occasion for displaying a preview image according to an embodiment of the present invention. The first time interval may be a time interval required by the terminal to receive the photographing instruction and complete this photographing operation. For example, after receiving a photographing instruction, the terminal takes a total of three seconds to obtain three images, and enters the preview phase again after the three seconds, and the terminal displays a preview image. In this case, the terminal may receive a photographing instruction again, to perform next photographing. In other words, the image processing method in this embodiment of the present invention not only may be applied to image processing for first-time photographing after the camera function is enabled, but also may be applied to image processing for subsequent photographing.

Optionally, in the foregoing examples, when displaying the preview image, the terminal may detect a photographing subject and a moving target, and display the detected photographing subject and the moving target in a highlighted manner. For example, one color box (for example, a green box) is used for a contour of the photographing subject, and another color box (for example, a red box) is used for the moving target. It should be noted that the terminal may use an existing detection algorithm to detect the photographing subject and the moving target. Details are not described in this application.

Step 302: The terminal obtains at least one first image.

In an example, when determining that the terminal is in a stable state, the terminal obtains the at least one first image in the preview image. The determining, by the terminal, that the terminal is in a stable state specifically includes: obtaining, by the terminal, motion data of the terminal; and determining, by the terminal based on the motion data of the terminal, that the terminal is in the stable state. A motion sensor may be integrated in the terminal. The motion data of the terminal is collected by using the motion sensor, thereby determining whether the terminal is in the stable state, to ensure that a preview picture of a camera is stable, and a stable image can be obtained. For example, an acceleration of the terminal is collected by using the motion sensor. When the acceleration of the terminal is less than or equal to a preset acceleration threshold, it is determined that the terminal is in the stable state. When the acceleration of the terminal is greater than a preset acceleration threshold, it is determined that the terminal is in an unstable state. The preset acceleration threshold may be determined based on an actual situation. This is not limited in this application.

Optionally, the terminal may obtain the at least one first image after remaining in the stable state for predetermined duration. After the terminal remains in the stable state for the predetermined duration, it indicates that the user has completed framing, so that the first image may be obtained. The predetermined duration may be determined based on an actual situation. This is not limited in this application.

Optionally, when starting to obtain the first image, the terminal may record a first moment t1 at which the terminal starts to obtain the first image.

Optionally, the terminal may shake in a process of obtaining the first image, that is, the terminal is in the unstable state. When the terminal is in the unstable state, the terminal may stop obtaining the first image. When determining that the terminal is in the stable state again, the terminal starts to obtain the first image again, and re-records the first moment t1 at which the terminal starts to obtain the first image. The terminal may obtain a preset quantity of first images in the preview phase. The preset quantity may be preset based on an actual situation. For example, the preset quantity needs to meet a requirement of subsequent image processing on a quantity of first images. The preset quantity may be one or more. In other words, the terminal may obtain one first image, or may obtain a plurality of first images.

In an example, when the terminal determines that the terminal is in the stable state, the terminal may obtain one first image in the preview phase. Optionally, after the terminal obtains one first image, the terminal may prompt the user that the obtaining of the first image is completed. A prompt manner is not limited in this embodiment of the present invention.

In another example, when the terminal determines that the terminal is in the stable state, the terminal may obtain a plurality of first images in the preview phase, for example, continuously obtain two or three first images. Optionally, after the terminal obtains the plurality of first images, the terminal may prompt the user that the obtaining of the first images is completed. A prompt manner is not limited in this embodiment of the present invention.

The following further describes a case in which the terminal obtains the plurality of first images in the preview phase.

In an example, the terminal may first obtain one first image, and then obtain one first image each time a preset time interval (also referred to as a second time interval or second duration) elapses, until the preset quantity of first images are obtained. The preset time interval is a time interval between obtaining one first image by the terminal and obtaining another first image by the terminal. The preset time interval may be determined based on an actual situation. This is not limited in this application. In an example, the preset time interval may be 1 second, and the preset quantity may be 2. In this case, after obtaining the 1st first image, the terminal obtains the 2nd first image when 1 second elapses. In other words, a time interval between obtaining the two first images by the terminal is 1 second. If the terminal receives the photographing instruction after 5 seconds starting from obtaining the 1st first image, the terminal obtains the two first images within the first 1 second, and no longer obtains a first image within the remaining 4 seconds.

In another example, the terminal obtains one first image each time a second time interval elapses, and when a quantity of obtained first images exceeds the preset quantity, retains the preset quantity of recently obtained first images. For example, the second time interval is 1 second, and the preset quantity is 2. If the terminal receives a photographing instruction after 5 seconds starting from obtaining the 1st first image, the terminal obtains a total of five first images within the 5 seconds, and the terminal may retain the last obtained two first images. In an example, the terminal establishes a buffer in a main memory, and buffers one first image at an interval of a preset time interval. First images whose quantity does not exceed a preset quantity are maintained in the buffer based on a first in first out (First Input First Output, FIFO) mechanism. For example, a buffer is established in a main memory, and a first image in a preview phase of a camera is buffered. For example, one first image is buffered at an interval of 1 second, and three first images are always maintained in the buffer based on the FIFO mechanism. After the terminal receives a photographing instruction, the terminal may continuously photograph three second images. When detecting and removing a moving target, the terminal may use the three first images and the three second images as a plurality of to-be-processed images. Obtaining a plurality of second images in a photographing phase by a terminal is described in detail in the following.

In another example, the terminal obtains two or more first images within a preset time interval (also referred to as a third time interval or third duration). The preset time interval is a time interval between obtaining the 1st first image by the terminal and obtaining the last first image by the terminal. The preset time interval may be determined based on an actual situation. This is not limited in this application. For example, if the preset time interval is 2 seconds, and one image is obtained at an interval of 0.5 second, five images need to be obtained.

Figure 5:
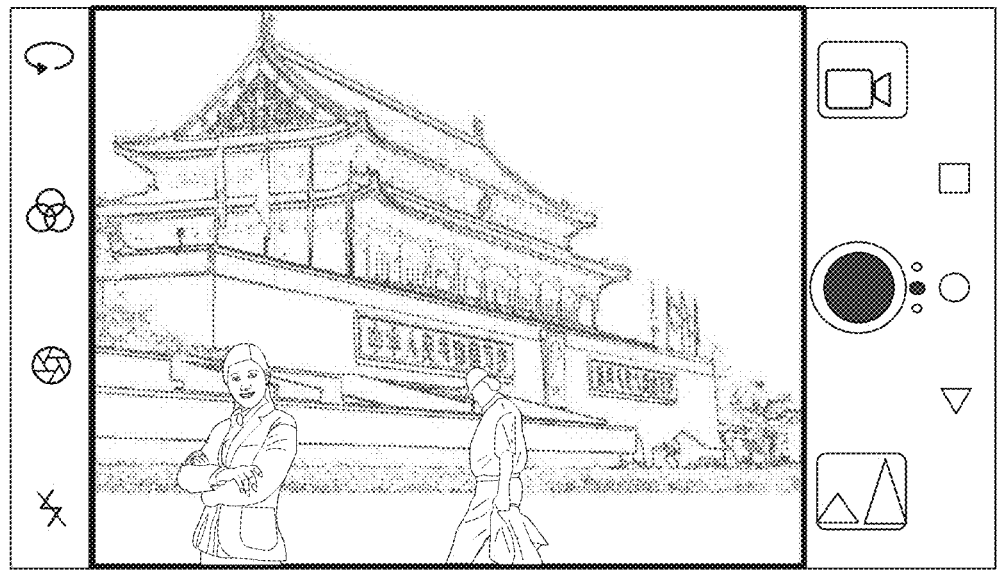
FIG. 5 is a schematic diagram of sending voice prompt information by a terminal according to an embodiment of the present invention.
Figure 6:
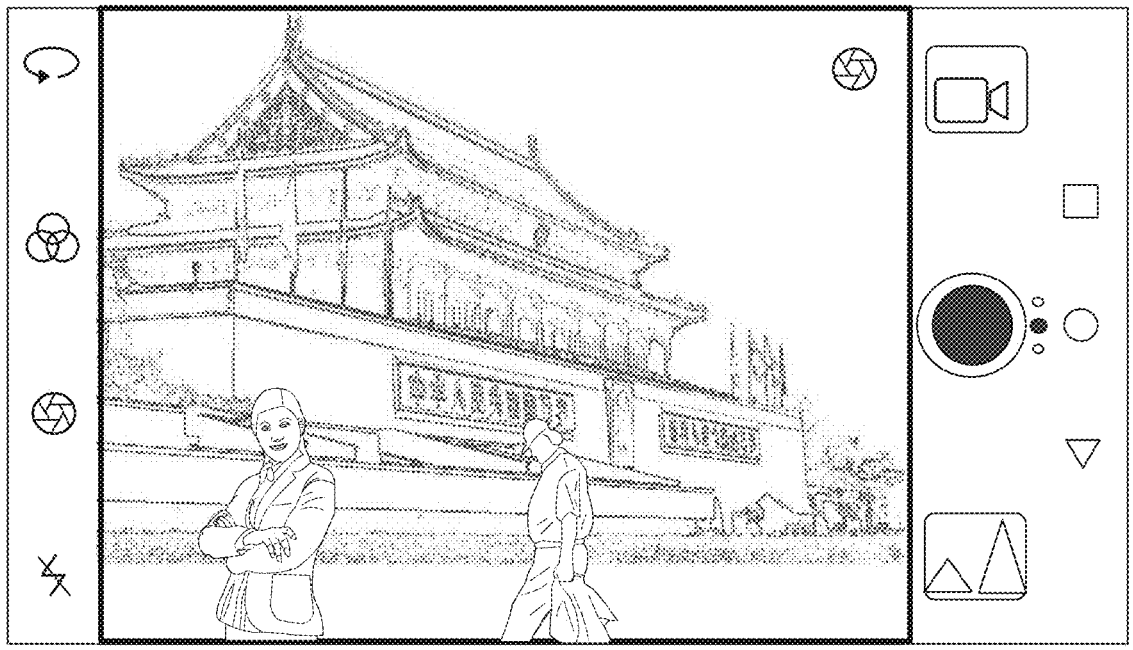
FIG. 6 is a schematic diagram of sending visual prompt information by a terminal according to an embodiment of the present invention.
Figure 7:
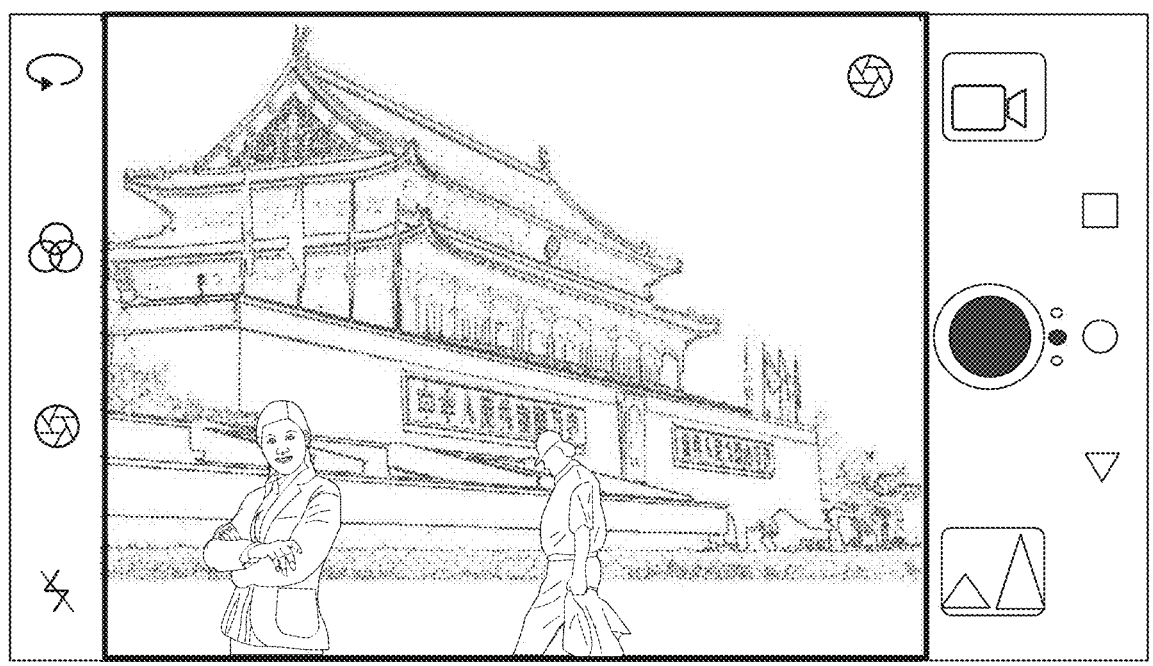
FIG. 7 is another schematic diagram of sending visual prompt information by a terminal according to an embodiment of the present invention.

Optionally, when the terminal obtains the first images, or when the terminal completes obtaining the first images, the terminal may send prompt information to the user. The prompt information may include a voice prompt, a visual prompt, a vibration prompt, or the like. In an example, as shown in FIG. 5, the terminal may send forth, by using a speaker, voice prompt information "An image is being obtained. Do not shake." In another example, as shown in FIG. 6, the terminal may send visual prompt information. For example, a dynamic icon used to indicate that an image is being obtained may be displayed on a display screen of the terminal, and a shape of the icon may be, but is not limited to, a downward arrow or a vortex shape; or the screen flickers, prompting the user that the terminal is obtaining an image. In another example, as shown in FIG. 7, when obtaining the first images, the terminal may display, on the display screen, a quantity of obtained first images or a quantity of first images that still need to be obtained. Alternatively, when obtaining the first images, the terminal may display, on the display screen, a size of a used cache capacity or a size of a remaining cache capacity.

Step 303: The terminal receives a photographing instruction.

In an example, the terminal receives a photographing instruction sent by the user, to enter the photographing phase and obtain the second images. The user may send the photographing instruction to the terminal in a plurality of manners. For example, when the user taps a photographing function icon displayed on the screen of the terminal, or when the user presses a function key of the terminal, or when the user sends a "photographing" voice, or when the user makes a preset gesture (for example, "O"), it may be considered as sending a photographing instruction to the terminal.

Optionally, before receiving the photographing instruction sent by the user, the terminal may prompt the user to send the photographing instruction, to inform the user that the obtaining of the first images is completed, and the terminal may receive the photographing instruction. The terminal may prompt the user when a condition is met. The condition includes: The terminal has obtained the preset quantity of first images; a cache of the terminal is already full; or duration of the preview phase of the terminal exceeds a preset duration threshold. The preset duration threshold may be determined based on an actual situation. This is not limited in this application.

Optionally, when the terminal receives the photographing instruction, in other words, when the terminal starts to obtain the second images, the terminal may record a second moment t2 at which the terminal starts to obtain the second images.

Step 304: The terminal obtains at least one second image.

The terminal starts to obtain the at least one second image when receiving the photographing instruction. In other words, the terminal enters a photographing phase, and photographs a photographed person.

in an example, the terminal may obtain one second image in the photographing phase. Optionally, after the terminal obtains one second image, the terminal may prompt the user that the obtaining of the second image is completed. A prompt manner is not limited in this embodiment of the present invention.

In another example, the terminal may obtain a plurality of second images in the photographing phase, for example, continuously obtain two or three second images. Optionally, after the terminal obtains a plurality of second images, the terminal may prompt the user that the obtaining of the second images is completed. A prompt manner is not limited in this embodiment of the present invention.

Optionally, because the terminal may shake in the photographing phase, the terminal may determine, in the photographing phase, whether the terminal is in the stable state. When the terminal is in the stable state, the terminal obtains at least one second image. When the terminal is in the unstable state, the terminal may stop obtaining the second image; and when determining that the terminal is in the stable state again, the terminal starts to obtain the second image again. For determining of stability of the terminal, refer to the description in the foregoing step 302. Details are not described herein again.

The following further describes a case in which the terminal obtains the plurality of second images in the photographing phase.

In an example, the terminal may first obtain one second image, and then obtain one second image each time a preset time interval (also referred to as a second time interval or second duration) elapses, until a second quantity of second images are obtained. The preset time interval is a time interval between obtaining one second image by the terminal and obtaining another second image by the terminal. The preset time interval may be determined based on an actual situation. This is not limited in this application. In an example, the preset time interval may be 1 second, and the second quantity may be 2. In this case, after obtaining the 1st second image, and the terminal obtains the 2nd second image when 1 second elapses. In other words, a time interval for obtaining all the two second images by the terminal is 1 second.

In another example, the terminal obtains the plurality of second images within a preset time interval (also referred to as a fourth time interval or fourth duration). The preset time interval is a time interval between obtaining the 1st second image by the terminal and obtaining the last second image by the terminal. The preset time interval may be determined based on an actual situation. This is not limited in this application. For example, if the preset time interval is 2 seconds, and one image is obtained at an interval of 0.5 second, five images need to be obtained.

Optionally, when the terminal obtains the second images, or when the terminal completes obtaining the second images, the terminal may send prompt information to the user. The prompt information may include a voice prompt, a visual prompt, a vibration prompt, or the like, in an example, as shown in FIG. 5, the terminal may send forth, by using a speaker, voice prompt information "An image is being obtained. Do not shake." In another example, as shown in FIG. 6, the terminal may send visual prompt information. For example, a dynamic icon used to indicate that an image is being obtained may be displayed on a display screen of the terminal, and a shape of the icon may be, but is not limited to, a downward arrow or a vortex shape; or the screen flickers, prompting the user that the terminal is obtaining an image. In another example, as shown in FIG. 7, When obtaining the second images, the terminal may display, on the display screen, a quantity of obtained second images or a quantity of second images that still need to be obtained. Alternatively, when obtaining the second images, the terminal may display, on the display screen, a size of a used cache capacity or a size of a remaining cache capacity.

Step 305: The terminal detects a moving target based on the first image and the second image.

In an example, when the terminal obtains one first image in the preview phase, and obtains one second image in the photographing phase, the terminal inputs the first image and the second image into a moving target detection algorithm, to detect the moving target.

In another example, when the terminal obtains a plurality of first images in the preview phase, and obtains one second image in the photographing phase, because usually a longer time interval between the first images and the second image indicates a larger moving distance of the moving target, the terminal inputs the 1st first image in the plurality of first images and the second image into the moving target detection algorithm, to detect the moving target. In this way, the terminal can more accurately detect the moving target.

Optionally, the terminal inputs clearest first images in the plurality of first images and the second image into the moving target detection algorithm, to detect the moving target. In this way, the terminal can more accurately detect the moving target. An existing method may be used to determine a clearness status of the preview image. Details are not described in this application.

Optionally, the terminal may separately input each of the plurality of first images and the second image into the moving target detection algorithm, to detect the moving target. In this way, when there are a plurality of moving targets, the terminal can more accurately determine the moving targets.

In another example, when the terminal obtains one first image in the preview phase, and obtains a plurality of second images in the photographing phase, based on a same reason in the foregoing example, the terminal inputs the first image and the last second image in the plurality of second images into the moving target detection algorithm, to detect the moving target.

Optionally, the terminal inputs the first image and clearest second images in the plurality of second images into the moving target detection algorithm, to detect the moving target. In this way, the terminal can more accurately detect the moving target.

Optionally, when there are a plurality of moving targets, the terminal may separately input the first image and each of the plurality of second images into the moving target detection algorithm, to detect the moving targets. In this way, when there are a plurality of moving targets, the terminal can more accurately determine the moving targets.

For a case in which the terminal obtains a plurality of first images in the preview phase and obtains a plurality of second images in the photographing phase, refer to the foregoing examples. Details are not described in this application.

In the foregoing examples, the terminal may detect the moving target in the first image and the second image by using an image differentiation method. Specifically, the terminal aligns the first image with the second image, and then performs image differentiation on the first image and the second image that have been aligned, thereby implementing the moving target detection.

It should be noted that the terminal may alternatively detect the moving target in the first image and the second image by using another existing moving target detection method. Details are not described in this application.

Step 306: The terminal splits the moving target from the first image and the second image, and performs fusion processing on the first image and the second image after the splitting.

In an example, after the moving target is detected by performing step 305, the moving target may be split from each first image and each second image. Because deformation occurs in an image obtained after the moving target is split, the image is complemented by using a background image, in another image, at a location of the removed moving target. A process of complementing an image based on another image is referred to as the fusion processing.

In another example, the moving target may not need to be split from each first image and each second image, but clearest images may be first sifted out from the at least one first image and the at least one second image. The moving target is split only from the clearest images, and then the clearest images are complemented by using a background image, in another image, at a location of the removed moving target.

It should be noted that the terminal may alternatively use another existing fusion processing method to perform fusion processing on the first image and the second image after the splitting. Details are not described in this application.

As shown in FIG. 3, in both step 302 and step 304, the terminal obtains the image. To better understand an occasion at which the terminal obtains the image, the following further describes, with reference to FIG. 8 or FIG. 9, the occasion at which the terminal obtains the image.

Figure 8:
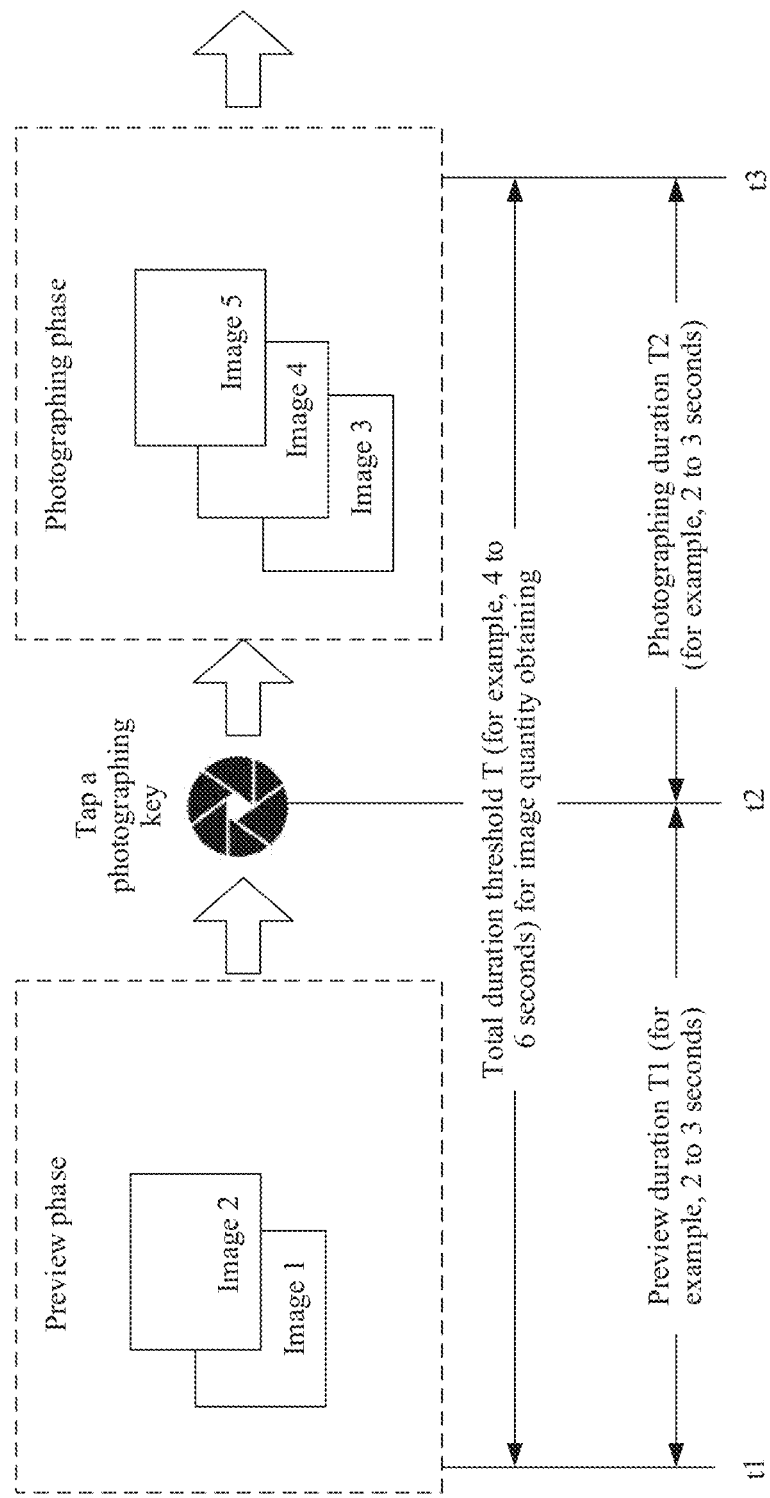
FIG. 8 is a schematic diagram of obtaining an image by a terminal according to an embodiment of the present invention.

FIG. 8 is a schematic diagram of obtaining an image by a terminal according to an embodiment of the present invention. As shown in FIG. 8, the terminal obtains the image in two phases, namely, a preview phase and a photographing phase. The preview phase starts from obtaining the 1st first image by the terminal, and ends with receiving a photographing instruction by the terminal. The photographing phase starts from receiving the photographing instruction by the terminal, and ends with obtaining the last second image by the terminal. In other words, a critical point between the preview phase and the photographing phase is receiving the photographing instruction by the terminal. It may be understood that, when a transmission time of the photographing instruction may be ignored, a time at which the terminal receives the photographing instruction and a time at which a user presses a photographing key may be considered to be the same. As shown in FIG. 8, the terminal records a first moment t1 at which the terminal obtains the 1st first image, and records a second moment t2 at which the terminal receives the photographing instruction, thereby determining preview duration T1=t2−t1. When the preview duration T1 is less than a preset total image obtaining duration threshold T, the terminal determines that photographing duration T2=T−T1. T2=t3−t2, and t3 is a third moment at which the terminal obtains the last second image. For example, if the preview duration T1 is 2 seconds, and the total image obtaining duration threshold T is 4 seconds, the photographing duration T2 is 2 seconds. For another example, if the preview duration T1 is 3 seconds, and the total image obtaining duration threshold T is 6 seconds, the photographing duration T2 is 3 seconds. It can be learned from the foregoing that, a time sensed by the user is usually the photographing duration T2. Because T2 is less than the total image obtaining duration threshold T, user experience is good. It may be understood that the total image obtaining duration threshold T may be determined based on an actual situation. For example, to meet a requirement of removing a moving target, the total image obtaining duration threshold T may be smallest duration that elapses between obtaining first images and obtaining second images.

Figure 9:
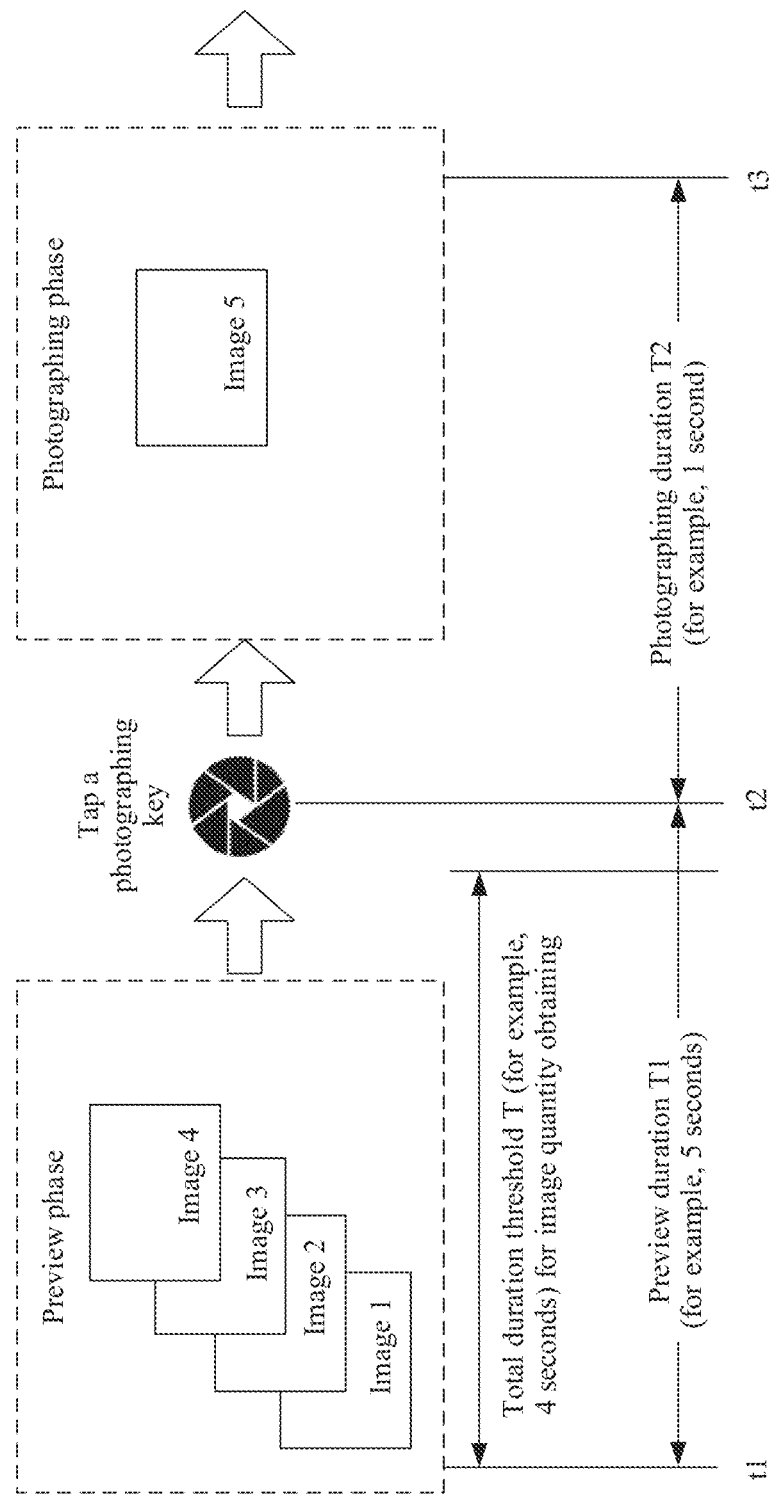
FIG. 9 is another schematic diagram of obtaining an image by a terminal according to an embodiment of the present invention.

FIG. 9 is another schematic diagram of obtaining an image by a terminal according to an embodiment of the present invention. As shown in FIG. 9, the terminal obtains the image in two phases, namely, a preview phase and a photographing phase. The preview phase starts from obtaining the 1st first image by the terminal, and ends with receiving a photographing instruction by the terminal. The photographing phase starts from receiving the photographing instruction by the terminal, and ends with obtaining the last second image by the terminal. In other words, a critical point between the preview phase and the photographing phase is receiving the photographing instruction by the terminal. It may be understood that, when a transmission time of the photographing instruction may be ignored, a time at which the terminal receives the photographing instruction and a time at which a user presses a photographing key may be considered to be the same. As shown in FIG. 9, the terminal records a first moment t1 at which the terminal obtains the 1st first image, and records a second moment t2 at which the terminal receives the photographing instruction, thereby determining preview duration T1=t2−t1. When the preview duration T is greater than or equal to a preset total image obtaining duration threshold T, the terminal does not need to determine photographing duration, and directly obtains a preset quantity of photographed images. T2=t3−t2, and t3 is a third moment at which the terminal obtains the last second image. For example, the preview duration T1 is 5 seconds, and the total image obtaining duration threshold T is 4 seconds. In this case, a second image is directly obtained (for example, duration T2 is 1 second). It can be learned from the foregoing that, a time sensed by the user is usually the photographing duration T2. Because T2 is inevitably less than the total image obtaining duration threshold T, user experience is good. The total image obtaining duration threshold T may be determined based on an actual situation. For example, to meet a requirement of removing a moving target, the total image obtaining duration threshold T may be smallest duration that elapses between obtaining first images and obtaining second images.

It should be noted that, if the terminal obtains a first image when enabling a camera function, the terminal records that the first moment t1 at which the terminal obtains the 1st first image is a moment at which the terminal enables the camera function. If the terminal first determines whether the terminal is in a stable state after enabling the camera function, and obtains a first image only when the terminal is in the stable state, the terminal records that the first moment t1 at which the terminal obtains the 1st first image is a moment at which the terminal determines that the terminal is in the stable state. If the terminal shakes after determining that the terminal is in the stable state, the terminal records that the first moment t1 at which the terminal obtains the 1st first image is a moment at which the terminal determines, for the last time, that the terminal is in the stable state. If the terminal obtains a plurality of first images, and stores only a preset quantity of recently obtained first images in a cache, the terminal records that the first moment t1 at which the terminal obtains the 1st first image is an obtaining time of one first image that is earliest obtained and that is stored in the cache.

In this embodiment of the present invention, it is not that the terminal obtains the plurality of images only after receiving the photographing instruction, but the terminal starts to obtain the images in the preview phase before receiving the photographing instruction. Therefore, a quantity of images that need to be obtained after the photographing instruction is received is reduced, so that a required photographing time is apparently shortened, photographing efficiency is high, user experience is good.

Figure 10:
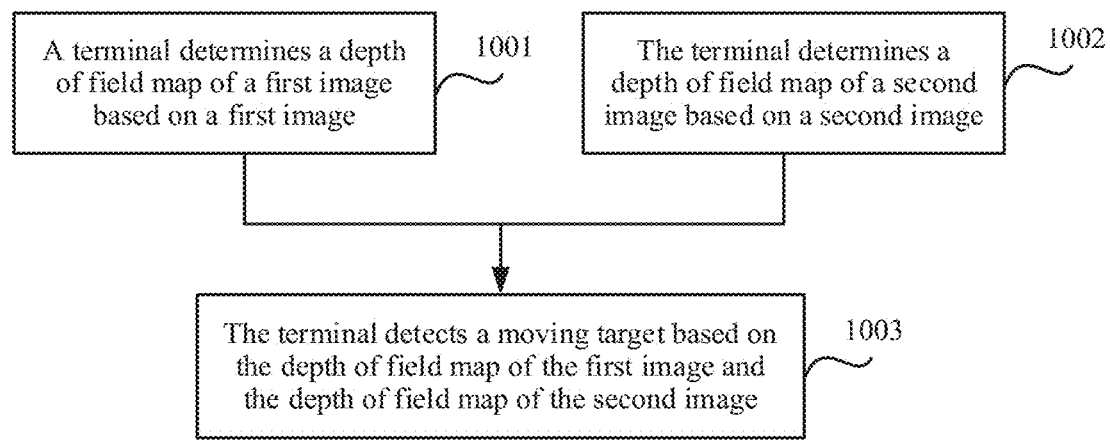
FIG. 10 is a schematic flowchart of a moving target detection method according to an embodiment of the present invention.

FIG. 10 is a schematic flowchart of a moving target detection method according to an embodiment of the present invention. The method may be used as an independent processing procedure used for moving target detection, or may be used as an example for implementing step 305, to be combined with the other steps in FIG. 3. The method includes the following steps.

Step 1001: The terminal determines a depth of field map of the first image based on the first image.

Step 1002: The terminal determines a depth of field map of the second image based on the second image.

Because a same method may be used to determine the depth of field map of the first image and determine the depth of field map of the second image, the method for determining the depth of field maps is described below in a unified manner.

Step 1003: The terminal detects the moving target based on the depth of field map of the first image and the depth of field map of the first image.

Because a boundary of the moving target can be apparently reflected in the depth of field maps, the moving target can be accurately detected.

In an example, the terminal has dual camera lenses. The terminal can accurately determine depth of field information by using the dual camera lenses.

A common detection method is based on a moving target detection algorithm for a two-dimensional image, and has a capability boundary, and cannot provide good coverage for all scenes. However, in this embodiment of the present invention, the dual camera lenses obtain the depth of field information, and a foreground image is separated from a background image with reference to the depth of field information, so that the moving target is accurately tracked and split. Foreground and background can be distinguished by using the obtained depth of field information, and a moving track of the moving target in the foreground or the background can be accurately obtained, thereby perform image splitting on the corresponding foreground or background. The depth of field information may be used to determine a depth of field. For example, the depth of field information may be a value of the depth of field.

Figure 11:
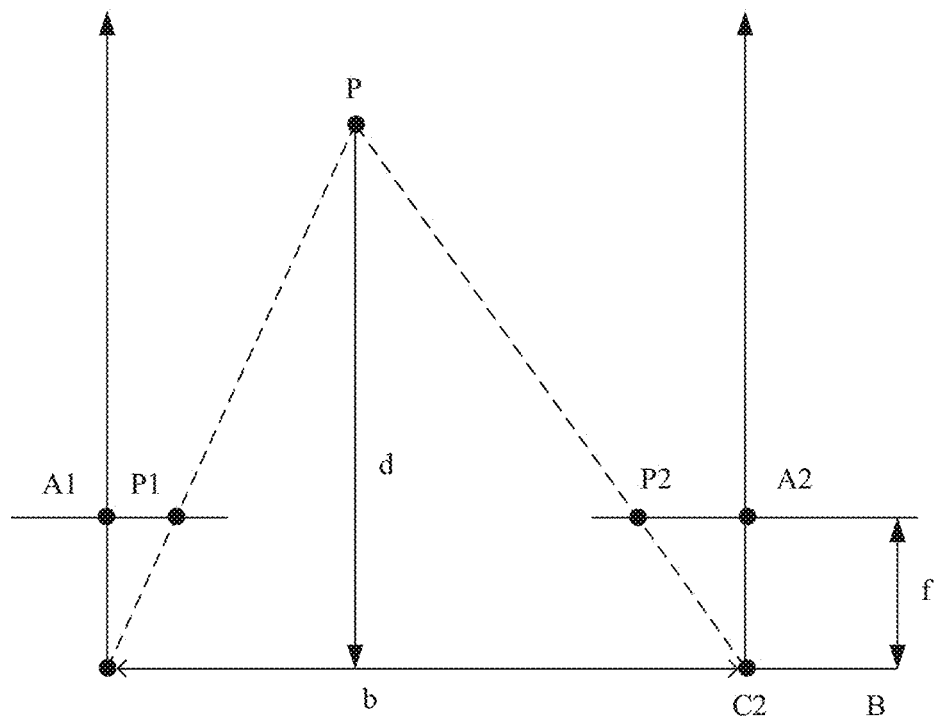
FIG. 11 is a schematic diagram of a depth of field determining method according to an embodiment of the present invention.

The following describes, with reference to FIG. 11, a depth of field determining method provided in this embodiment of the present invention. FIG. 11 is a schematic diagram of a depth of field determining method according to an embodiment of the present invention. A case in which two camera lenses are the same and corresponding axes of their coordinate systems are parallel to each other, but origin locations of the two camera lenses are different is considered. It is assumed that C1 and C2 are respectively optical center positions (namely, lens centers) of a left camera lens and a right camera lens, a polar line distance between C1 and C2 is b, and focal lengths of the camera lenses are f. A point P is a point in space, projection points of the point P on a left camera lens image and a right camera lens image are respectively P1 and P2, and a perpendicular distance between P and a connection line from C1 to C2 is d. Lines perpendicular to imaging planes are respectively drawn through C1 and C2, and feet of perpendiculars are respectively A1 and A2. A line perpendicular to a baseline is drawn through P, and this line and the baseline intersect at B.

Assuming that |A1P1|=1a, |A2P2|=1b, and |P2B|=a.

$$d = f\frac{a + lb}{lb} = \frac{bf}{la - lb} \quad (1)$$

It can be learned from the formula (1) that the distance d is depth of field information. The distance d is related to the baseline b, the focal length f, and 1a-1b. 1a-1b is referred to as a parallax of the point P on two imaging planes, and reflects a location difference between image points of the point P on the two imaging planes. Because b and f are known, to implement ranging of binocular stereoscopic parallax, the most crucial is to obtain the parallax 1a-1b, in other words, to implement correspondence between projection points of the same point P in space on the two images, namely, the left and right images. In addition, reducing the distance of the baseline b not only reduces a largest distance that can be measured, but also reduces precision between relative depths of field. However, precision of the 1a-1b is more dependent on a size of a pixel. During actual calculation, this precision is not less than one pixel.

During actual calculation of a depth of field, a plurality of different planes may be obtained through division between a largest distance and a smallest distance. Precision between each plane is determined by actual precision of an algorithm, and in this way, impact of an error can be reduced, and precision of the depth of field calculation can be improved.

Figure 12:
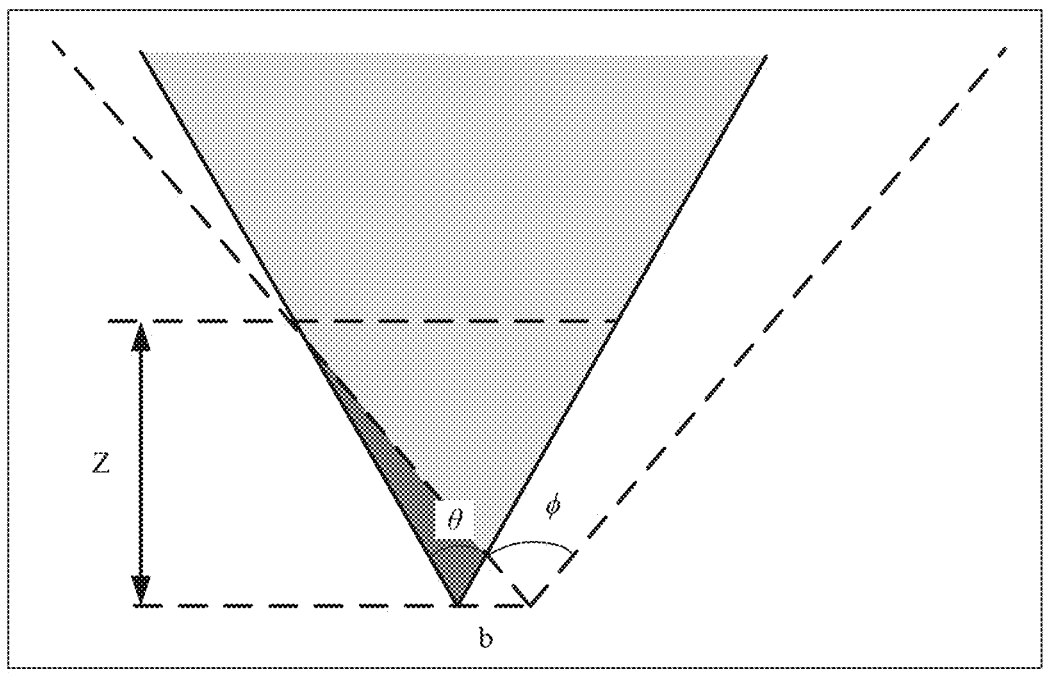
FIG. 12 is another schematic diagram of a depth of field determining method according to an embodiment of the present invention.

FIG. 12 is another schematic diagram of a depth of field determining method according to an embodiment of the present invention. The foregoing depth of field calculation formula is based on two parallel same camera lenses. However, during actual use, there are actually many problems. For example, in FIG. 12, the two camera lenses always have some scenes that cannot cross a scene of each other. Therefore, actual field of view (field angle, FOV) designs of the two camera lenses are different. A primary camera lens is used to obtain an actual image, and an image of a secondary camera lens is mainly used as reference for calculating a depth of field. An FOV of the secondary camera lens is usually greater than that of the primary camera lens, but even so, a relatively close object may still not be in images of the two camera lenses at the same time. As shown in FIG. 12, θ is the FOV of the primary camera lens, φ is the FOV of the secondary camera lens, Z is a depth of field, and b is a baseline. A formula (2) for calculating the depth of field Z is as follows:

$$\phi = 2\tan^{-1}\left(\frac{Z\tan(\theta/2 + b)}{Z}\right) \quad (2)$$

For the case in FIG. 12, the formula for calculating the depth of field needs to be adjusted. For example, because the two camera lenses have different imaging, and object zoom ratios, changing image zoom ratios to the same needs to be considered during distance calculation. Actually, not only the zoom ratios, but also distortion, a posture difference, and the like all need to be adjusted. This is very important correction during the depth of field calculation.

Figure 13:
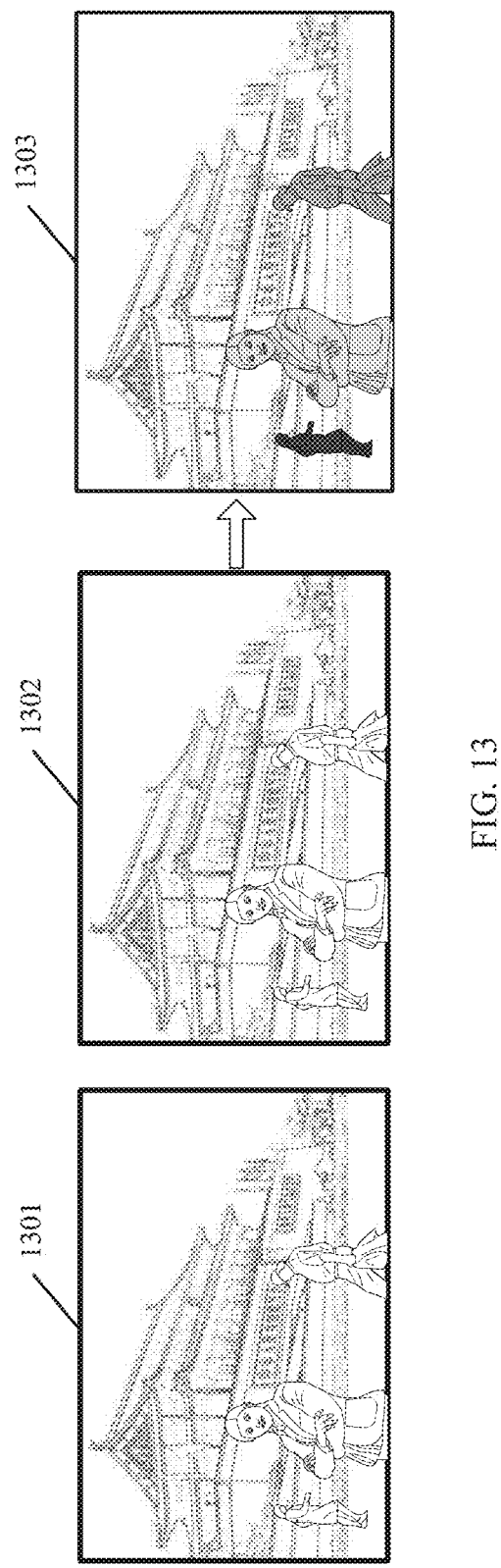
FIG. 13 is a schematic diagram of obtaining a depth of field map by a terminal according to an embodiment of the present invention.

FIG. 13 is a schematic diagram of obtaining a depth of field map by a terminal according to an embodiment of the present invention. 1301 in FIG. 13 is a reference image, 1302 in FIG. 13 is a target image, and a difference image, namely, 1303 in FIG. 13, between 1301 in FIGS. 13 and 1302 in FIG. 13 is determined based on 1301 in FIGS. 13 and 1303 in FIG. 13. The difference image represents a displacement difference, of a same point, between 1301 in FIGS. 13 and 1302 in FIG. 13. Because a displacement difference in triangulation location is proportional to a depth of field, the difference image is directly used as the depth of field map in many cases. In most cases, this image is stored in a form of a grayscale image. Through comparison between 1301 in FIG. 13, 1302 in FIG. 13, and 1303 in FIG. 13, it can be found that boundaries of adjacent objects are not clear in 1301 in FIG. 13 and 1302 in FIG. 13, but the boundaries of the adjacent objects in 1303 in FIG. 13 become clear, thereby facilitating splitting of a target object from the image.

In this embodiment of the present invention, a three-dimensional (3D) scene may be further reconstructed by using the depth of field map. Calibration, correction, stereoscopic correspondence, and triangulation survey may be used. After the 3D scene is reconstructed, each object in the image can be more easily identified, and the target object can be accurately split.

It should be noted that the method in FIG. 13 may be used to determine an image boundary of a first image, or may be used to determine an image boundary of a second image. Images obtained by using a terminal having dual camera lenses each have a reference image and a target image.

In addition, a process of the splitting and the fusion processing in step 306 in FIG. 3 is further described.

Figure 14:
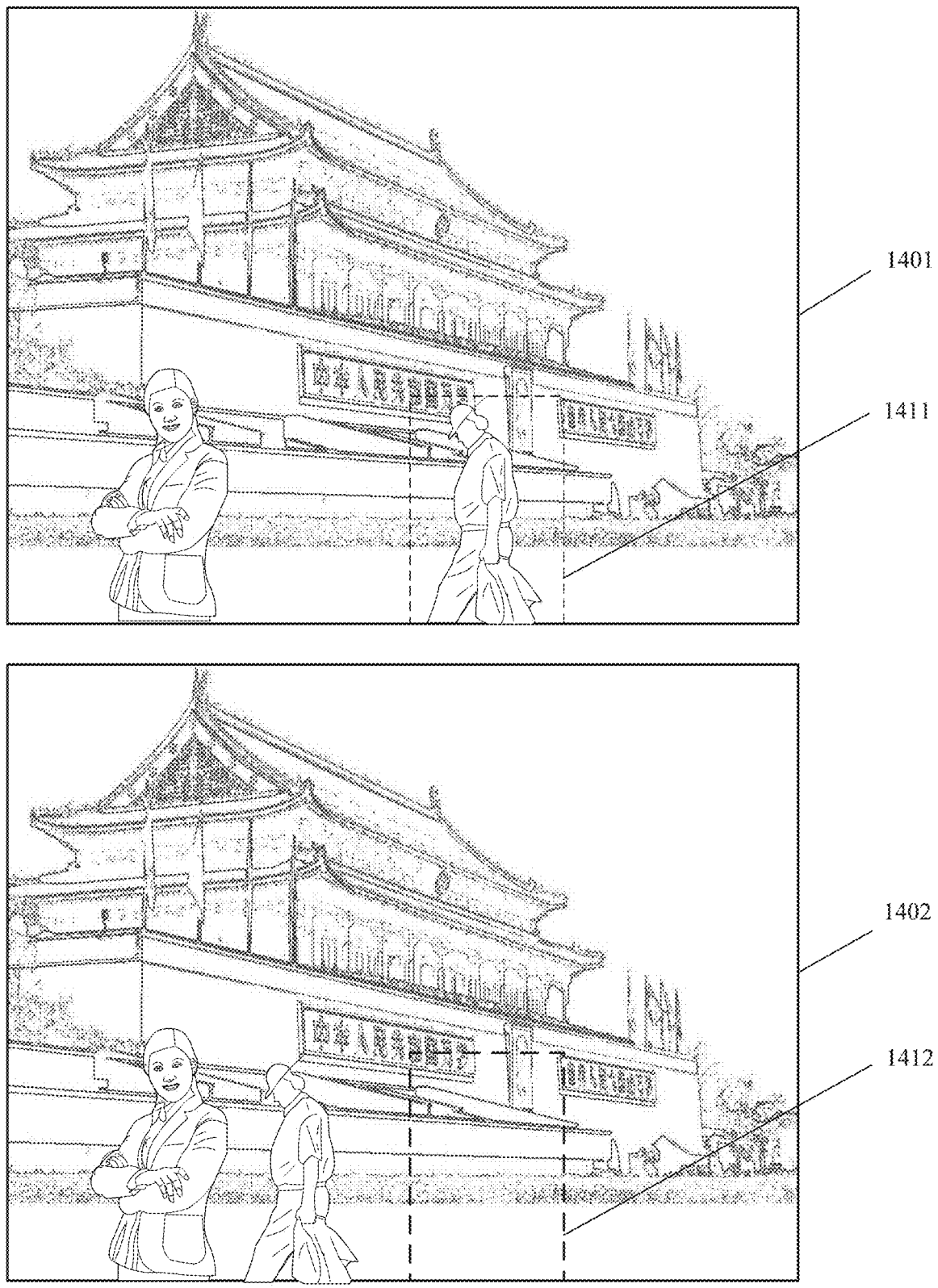
FIG. 14 is a schematic diagram of a method for performing fusion processing on a plurality of images according to an embodiment of the present invention.

FIG. 14 is a schematic diagram of a method for performing fusion processing on a plurality of images according to an embodiment of the present invention. As shown in FIG. 14, an image 1401 and an image 1402 in FIG. 14 may be used as images for the fusion processing. A moving target 1411 may be first split from the image 1401, and then the image 1401 is complemented by using a background image 1412, in the image 1402, at a location of the removed moving target.

It may be understood that, when the clearest image is complemented by using a background image, in another image, at a location of a removed moving target, the background picture, in the another picture, at the location of the removed moving target is required not to include the moving target. For example, the background picture 1412, in the image 1402 in FIG. 14, at the location of the removed moving target does not include the moving target.

It may be understood that there may be two or more images for performing fusion processing. When relatively many moving targets need to be removed from an image, and two images are insufficient to be fused to obtain a complete image that has no moving target, fusion processing may be performed by using more images, to obtain a complete image that has no moving target.

In this embodiment of the present invention, an improved detection method is provided. Compared with moving target detection and removal according to a common detection method, detection accuracy is high, no problem of image deformation occurs after the moving target removal, and an effect is ideal.

Figure 15:
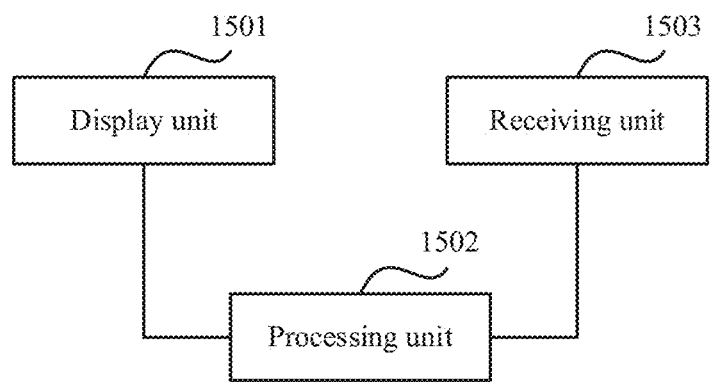
FIG. 15 is a schematic structural diagram of a terminal according to an embodiment of the present invention.

FIG. 15 is a schematic structural diagram of a terminal according to an embodiment of the present invention. The terminal is configured to perform the image processing method provided in the embodiments of the present invention. The terminal includes:
a display unit 1501, configured to display a preview image;
a processing unit 1502, configured to obtain at least one first image in the preview image displayed by the display unit 1501 and
a receiving unit 1503, configured to receive a photographing instruction.

The processing unit 1502 is further configured to: obtain at least one second image; detect a moving target based on the first image and the second image; and split the moving target from the first image and the second image, and perform fusion processing on the first image and the second image after the splitting.

In an example, that the display unit 1501 displays the preview image includes: displaying, by the display unit 1501, the preview image when a camera function of the terminal is enabled; or displaying, by the display unit 1501, the preview image when a camera function of the terminal enters a first photo mode; or displaying, by the display unit 1501, the preview image when the receiving unit 1503 receives the photographing instruction and a first time interval elapses.

In an example, that the processing unit 1502 obtains the at least one first image in the preview image displayed by the display unit 1501 includes: obtaining, by the processing unit 1502, a preset quantity of first images in the preview image displayed by the display unit 1501.

In an example, the obtaining, by the processing unit 1502, a preset quantity of first images in the preview image displayed by the display unit 1501 includes: obtaining, by the processing unit 1502 each time a second time interval elapses, one of the first images in the preview image displayed by the display unit 1501, until the preset quantity of the first images in the preview image are obtained.

In an example, the obtaining, by the processing unit 1502, a preset quantity of first images in the preview image displayed by the display unit 1501 includes: obtaining, by the processing unit 1502 each time a second time interval elapses, one of the first images in the preview image displayed by the display unit 1501, and when a quantity of obtained first images in the preview image exceeds the preset quantity, retaining the preset quantity of recently obtained first images in the preview image.

In an example, that the processing unit 1502 obtains the at least one first image in the preview image displayed by the display unit 1501 includes: obtaining, by the processing unit 1502 within a third time interval, at least two first images in the preview image displayed by the display unit 1501.

In an example, before the processing unit 1502 obtains the at least one first image in the preview image displayed by the display unit 1501, the processing unit 1502 is further configured to: obtain motion data of the terminal; and determine, based on the motion data, that the terminal is in a stable stale.

In an example, that the processing unit 1502 detects the moving target based on the first image and the second image includes: determining, by the processing unit 1502, depth of field information of the first image and depth of field information of the second image based on the first image and the second image; and detecting, by the processing unit 1502, the moving target based on the depth of field information.

In an example, the terminal has dual camera lenses.

In this embodiment of the present invention, it is not that the processing unit 1502 obtains the plurality of images only after the receiving unit 1503 receives the photographing instruction, but the processing unit 1502 starts to obtain the images in the preview phase before the receiving unit 1503 receives the photographing instruction. Therefore, a quantity of images that need to be obtained by the receiving unit 1503 after the photographing instruction is received is reduced, so that a required photographing time is apparently shortened, photographing efficiency is high, and user experience is good.

The terminal provided in this embodiment of the present invention may be configured to perform the image processing method provided in the foregoing embodiments of the present invention. For corresponding features and descriptions, refer to related content of the foregoing method. Details are not described in this embodiment again.

In addition, the RF circuit 110 and the input unit 130 in the terminal shown in FIG. 2 may correspond to the receiving unit 1503 of the terminal in FIG. 15. The display unit 140 may correspond to the display unit 1501 in FIG. 15. The processor 150 and the sensor 170 may correspond to the processing unit 1502 in FIG. 15. Details are not described herein again.

Figure 16:
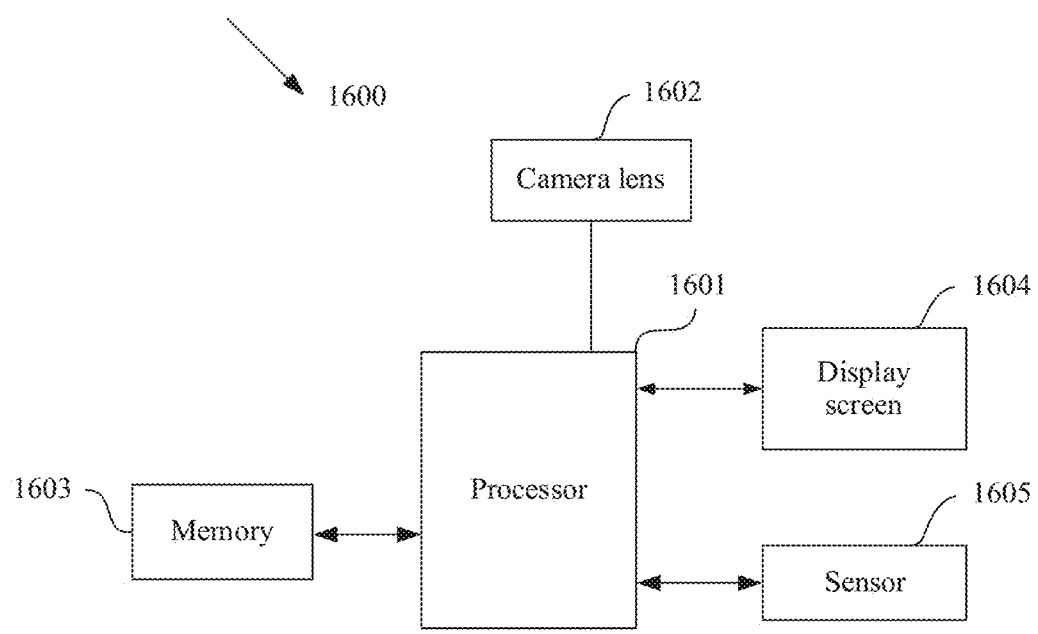
FIG. 16 is another schematic structural diagram of a terminal according to an embodiment of the present invention.

FIG. 16 is a schematic structural diagram of a terminal according to an embodiment of the present invention. The terminal provided in this embodiment of the present invention may be configured to implement the method implemented in the foregoing embodiment of the present invention shown in FIG. 3 or FIG. 10. For ease of description, only parts related to this embodiment of the present invention are illustrated. For specific technical details that are not disclosed, refer to the foregoing method embodiments of the present invention, and another part of this application, such as the terminal shown in FIG. 2. As shown in FIG. 16, the terminal 1600 includes a processor 1601, a camera lens 1602, a memory 1603, a display screen 1604, and a sensor 1605.

The memory 1603 is configured to store a program instruction.

The processor 1601 is configured to perform the following operations according to the program instruction stored in the memory 1603:

displaying a preview image by using the display screen 1604;

obtaining at least one first image in the preview image;

receiving a photographing instruction;

obtaining at least one second image by using the camera lens 1602;

detecting a moving target based on the first image and the second image; and splitting the moving target from the first image and the second image, and performing fusion processing on the first image and the second image after the splitting.

In an example, that the processor 1601 performs the operation of displaying a preview image by using the display screen 1604 includes: displaying the preview image by using the display screen 1604 when a camera function of the terminal is enabled; or displaying the preview image by using the display screen 1604 when a camera function of the terminal enters a first photo mode; or displaying the preview image by using the display screen 1604 when receiving the photographing instruction and a first time interval elapses.

In an example, that the processor 1601 performs the operation of obtaining at least one first image in the preview image includes: obtaining a preset quantity of first images in the preview image.

In an example, that the processor 1601 performs the operation of obtaining a preset quantity of first images in the preview image includes: obtaining one of the first images in the preview image each time a second time interval elapses, until the preset quantity of first images in the preview image are obtained.

In an example, that the processor 1601 performs the operation of obtaining a preset quantity of first images in the preview image includes: obtaining one of the first images in the preview image each time a second time interval elapses, and when a quantity of obtained first images in the preview image exceeds the preset quantity, retaining the preset quantity of recently obtained first images in the preview image.

In an example, that the processor 1601 performs the operation of obtaining at least one first image in the preview image includes: obtaining at least two first images in the preview image within a third time interval.

In an example, before the processor 1601 performs the operation of obtaining at least one first image in the preview image, the processor 1601 is further configured to perform the following operations according to the program instruction stored in the memory 1603: obtaining motion data of the terminal by using the sensor 1605; and determining, based on the motion data, that the terminal is in a stable state.

In an example, that the processor 1601 performs the operation of detecting a moving target based on the first image and the second image includes: determining depth of field information of the first image and depth of field information of the second image based on the first image and the second image; and detecting the moving target based on the depth of field information.

In an example, the cameras lens 1602 is dual camera lenses.

In this embodiment of the present invention, it is not that the processor 1601 obtains the plurality of images only after receiving the photographing instruction, but the processor 1601 starts to obtain the images in the preview phase before receiving the photographing instruction, Therefore, a quantity of images that need to be obtained after the photographing instruction is received is reduced, so that a required photographing time is apparently shortened, photographing efficiency is high, and user experience is good.

An embodiment of the present invention further provides a chip apparatus. The chip includes a processing unit, configured to perform the methods shown in FIG. 3 to FIG. 14.

An embodiment of the present invention further provides a chip apparatus, and the chip apparatus includes a processor and a memory. The memory includes an instruction, and the processor runs the instruction to perform the methods shown in FIG. 3 to FIG. 14.

In this embodiment of the present invention, the chip apparatus may be a chip in a terminal, and the chip includes: a processing unit and a communications unit. The processing unit may be, for example, a processor, and the processor may be a processor in various types of processors 150 described above. The communications unit may be, for example, an input/output interface, a pin, or a circuit. The communications unit includes a system bus. Optionally, the chip further includes a storage unit. The storage unit may be a memory inside the chip, for example, a register, a cache, a random access memory (random access memory, RAM), an EEPROM, or a FLASH. Alternatively, the storage unit may be a memory located outside the chip, and the memory may be a memory in various types of memories 120 described above. The processor is connected to the memory, and the processor may run the instruction stored in the memory, to enable the chip apparatus to perform the methods shown in FIG. 3 to FIG. 14.

All or some of the foregoing embodiments of the present invention may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of procedures or functions according to the embodiments of the present invention are generated. The computer may be a general-purpose computer, a dedicated computer, a computer network, or another programmable apparatus. The computer instructions may be stored in a computer-readable storage medium, or may be transmitted from a computer-readable medium to another computer-readable medium. For example, the computer instructions may be transmitted from a website, a computer, a server, or a data center in a wired (for example, coaxial cable, optical fiber, digital subscriber line (Digital Subscriber Line, DSL)) manner or a wireless (for example, infrared, radio, or microwave) manner to another website, computer, server, or data center. The computer-readable storage medium may be any usable medium accessible by a computer, or a data storage device, such as a server or a data center, including one or more usable mediums that are integrated. The usable medium may be a magnetic medium (for example, a floppy disk, a hard disk, or a magnetic tape), an optical medium (for example, a DVD), a semiconducting medium (for example, a solid-state drive (Solid State Disk, SSD)), or the like.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. An image processing method implemented by a terminal, wherein the image processing method comprises:
    displaying a preview image;
    obtaining a photographing instruction when displaying the preview image;
    generating a target image in response to the photographing instruction by:
        obtaining a first image in the preview image, wherein obtaining the first image comprises obtaining a preset quantity of first images in the preview image by:
            obtaining one of the first images in the preview image each time a second time interval elapses; and
            retaining the preset quantity of the first images that was obtained last in the preview image when a quantity of obtained first images in the preview image exceeds the preset quantity;
        obtaining a second image;
        determining a moving object based on the first image and the second image; and
        fusing the first image and the second image to obtain the target image, wherein the target image does not include the moving object, and
    wherein displaying the preview image comprises:
        displaying the preview image when a camera function of the terminal is enabled;
        displaying the preview image when the camera function of the terminal enters a first photo mode; or
        displaying the preview image when the terminal receives the photographing instruction and a first time interval elapses.

2. The image processing method of claim 1, wherein obtaining the preset quantity of the first images in the preview image comprises obtaining the one of the first images in the preview image each time the second time interval elapses until the preset quantity of the first images in the preview image is obtained.

3. The image processing method of claim 1, wherein before obtaining the first image in the preview image, the image processing method further comprises:
    obtaining motion data of the terminal; and
    determining, based on the motion data, that the terminal is in a stable state.

4. The image processing method of claim 3, wherein determining the moving object based on the first image and the second image comprises:
    determining depth of field information of the first image and depth of field information of the second image based on the first image and the second image; and
    detecting the moving object based on the depth of field information of the first image and the depth of field information of the second image.

5. The image processing method of claim 4, wherein the terminal comprises dual camera lenses.

6. The image processing method of claim 1, wherein obtaining the first image comprises obtaining at least two first images in the preview image within a third time interval.

7. A terminal, comprising:
    a processor; and
    a memory coupled to the processor and storing instructions that, when executed by the processor, cause the terminal to be configured to:
        display a preview image, wherein to display the preview image the instructions cause the terminal to be configured to:
            display the preview image when a camera function of the terminal is enabled;
            display the preview image when the camera function of the terminal enters a first photo mode; or
            display the preview image when the terminal receives a photographing instruction and a first time interval elapses;
        obtain the photographing instruction when displaying the preview image; and
        generate a target image in response to the photographing instruction by:
            obtaining a first image in the preview image, wherein obtaining the first image comprises obtaining a preset quantity of first images in the preview image by:
                obtaining one of the first images in the preview image each time a second time interval elapses; and
                retaining the preset quantity of the first images that was obtained last in the preview image when a quantity of obtained first images in the preview image exceeds the preset quantity;
            obtaining a second image;
            determining a moving object based on the first image and the second image; and
            fusing the first image and the second image to obtain the target image, wherein the target image does not include the moving object.

8. The terminal of claim 7, wherein to obtain the preset quantity of the first images in the preview image, the instructions cause the terminal to be configured to obtain the one of the first images in the preview image each time the second time interval elapses until the preset quantity of first images in the preview image is obtained.

9. The terminal of claim 7, wherein before obtaining the first image in the preview image, the instructions further cause the terminal to be configured to:
    obtain motion data of the terminal; and
    determine, based on the motion data, that the terminal is in a stable state.

10. The terminal of claim 9, further comprising dual camera lenses.

11. The terminal of claim 7, wherein to obtain the first image in the preview image, the instructions cause the terminal to be configured to obtain at least two first images in the preview image within a third time interval.

12. The terminal of claim 11, wherein to determine the moving object based on the first image and the second image the instructions cause the terminal to be configured to:

determine depth of field information of the first image and depth of field information of the second image based on the first image and the second image; and detect the moving target based on the depth of field information of the first image and the depth of field information of the second image.

13. The terminal of claim 7, wherein to display the preview image, the instructions cause the processor to be configured to display the preview image when the camera function of the terminal enters the first photo mode.

14. The terminal of claim 7, wherein to display the preview image, the instructions cause the processor to be configured to display the preview image when the terminal receives the photographing instruction and the first time interval elapses.

15. An image processing method implemented by a terminal, wherein the image processing method comprises:

displaying a preview image;

obtaining a photographing instruction when displaying the preview image;

generating a target image in response to the photographing instruction by:

obtaining a first image in the preview image, wherein obtaining the first image comprises obtaining a preset quantity of first images in the preview image by:

obtaining one of the first images in the preview image each time a second time interval elapses; and retaining the preset quantity of the first images that was obtained last in the preview image when a quantity of obtained first images in the preview image exceeds the preset quantity;

obtaining a second image;

determining a moving object based on the first image and the second image; and fusing the first image and the second image to obtain the target image, wherein the target image does not include the moving object.

16. The image processing method of claim 15, wherein displaying the preview image comprises displaying the preview image when a camera function of the terminal is enabled.

17. The image processing method of claim 15, wherein displaying the preview image comprises displaying the preview image when a camera function of the terminal enters a first photo mode.

18. The image processing method of claim 15, wherein displaying the preview image comprises displaying the preview image when the terminal receives the photographing instruction and a first time interval elapses.

* * * * *